United States Patent
Kim et al.

(10) Patent No.: US 10,454,096 B2
(45) Date of Patent: Oct. 22, 2019

(54) NEGATIVE ELECTRODE FOR LITHIUM SECONDARY BATTERY AND LITHIUM SECONDARY BATTERY COMPRISING THE SAME

(71) Applicant: LG Chem, Ltd., Seoul (KR)

(72) Inventors: Young-Jae Kim, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 15/685,065

(22) Filed: Aug. 24, 2017

(65) Prior Publication Data
US 2018/0062158 A1    Mar. 1, 2018

(30) Foreign Application Priority Data

Aug. 26, 2016  (KR) .................. 10-2016-0109236

(51) Int. Cl.
| | |
|---|---|
| H01M 4/133 | (2010.01) |
| C08L 9/06 | (2006.01) |
| H01M 4/62 | (2006.01) |
| H01M 4/131 | (2010.01) |
| H01M 4/36 | (2006.01) |
| H01M 4/48 | (2010.01) |
| H01M 4/587 | (2010.01) |

(Continued)

(52) U.S. Cl.
CPC ............ *H01M 4/133* (2013.01); *C08L 9/06* (2013.01); *H01M 4/131* (2013.01); *H01M 4/364* (2013.01); *H01M 4/366* (2013.01); *H01M 4/48* (2013.01); *H01M 4/587* (2013.01); *H01M 4/622* (2013.01); *C01B 32/20* (2017.08); *H01M 4/623* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2014/0186702 A1* | 7/2014 | Takahata ............... | H01M 4/133 429/211 |
| 2014/0287316 A1 | 9/2014 | Ahn et al. | |

(Continued)

FOREIGN PATENT DOCUMENTS

| | | |
|---|---|---|
| KR | 20140095980 A | 8/2014 |
| KR | 20160087121 A | 7/2016 |

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a negative electrode for a lithium secondary battery having excellent electric conductivity and adhesion even though a high-loading negative electrode is used, and the negative electrode includes a negative electrode current collector; a first negative electrode mixture layer containing a first negative electrode active material, a first polymer binder and a first conductive material and formed on at least one surface of the negative electrode current collector; and a second negative electrode mixture layer containing a second negative electrode active material, a second polymer binder and a second conductive material and formed on an upper surface of the first negative electrode mixture layer, wherein the first negative electrode active material contains natural graphite and silicon oxide, and the second negative electrode active material contains artificial graphite.

11 Claims, 4 Drawing Sheets

(51) Int. Cl.
  *C01B 32/20* (2017.01)
  *H01M 10/0525* (2010.01)

(56) References Cited

U.S. PATENT DOCUMENTS

2014/0363736 A1  12/2014  Kim et al.
2017/0125806 A1* 5/2017  Wang .................... H01M 4/133

* cited by examiner

NEGATIVE ELECTRODE FOR LITHIUM SECONDARY BATTERY AND LITHIUM SECONDARY BATTERY COMPRISING THE SAME

TECHNICAL FIELD

The present application claims priority to Korean Patent Application No. 10-2016-0109236 filed on Aug. 26, 2016 in the Republic of Korea, the disclosures of which are incorporated herein by reference.

The present disclosure relates to a negative electrode for a lithium secondary battery and a lithium secondary battery comprising the same, and more particularly, to a negative electrode for a lithium secondary battery, which has a high capacity characteristic, and a lithium secondary battery comprising the same.

BACKGROUND ART

Along with technology development and increased demand for mobile devices, the demand for secondary batteries as an energy source is rapidly increasing. Among the secondary batteries, a lithium secondary battery having high energy density and voltage, long life cycle and low discharge rate is commercially available and widely used.

The lithium secondary battery includes a positive electrode having a positive electrode active material on at least one surface of a positive electrode current collector, a negative electrode having a negative electrode active material on at least one surface of a negative electrode current collector, and a separator interposed between the positive electrode and the negative electrode. In addition, as the interest in environmental issues grows, the market for high-capacity battery-driven devices such as electric vehicles and hybrid electric vehicles, which are capable of replacing vehicles using fossil fuel such as gasoline vehicles and diesel vehicles, one of main factors of air pollution, is growing, and accordingly the demand base for high capacity batteries is expanding. Thus, it is required to design a high capacity electrode for producing a lithium secondary battery with high energy density, high output and high discharge voltage as a power source of these devices.

For designing a high-loading electrode, the amount of a negative electrode active material is increased, which results in the increase of an electrode thickness. However, if the electrode thickness is increased, the binder may be irregularly distributed, which may deteriorate adhesion.

In addition, Si, its oxide or its alloy is being used to exhibit high capacity as a negative electrode active material. However, Si has a weak affinity with a binder, which may deteriorate the adhesion of the electrode, and may also degrade the life characteristic due to volume expansion.

DISCLOSURE

Technical Problem

The present disclosure is directed to providing a high-loading negative electrode for a lithium secondary battery having excellent adhesion, improved output characteristics and improved life characteristics, and a lithium secondary battery containing the negative electrode.

Technical Solution

In one aspect of the present disclosure, there is provided a negative electrode for a lithium secondary battery, comprising: a negative electrode current collector; a first negative electrode mixture layer containing a first negative electrode active material, a first polymer binder and a first conductive material and formed on at least one surface of the negative electrode current collector; and a second negative electrode mixture layer containing a second negative electrode active material, a second polymer binder and a second conductive material and formed on an upper surface of the first negative electrode mixture layer, wherein the first negative electrode active material contains natural graphite and silicon oxide, and the second negative electrode active material contains artificial graphite.

Preferably, the first negative electrode active material may contain 80 to 100 wt % of natural graphite and silicon oxide, based on the total weight of the first negative electrode active material, and the natural graphite and the silicon oxide may have a weight ratio of 80:20 to 95:5. In addition, the second negative electrode active material may contain 90 to 100 wt % of artificial graphite, based on the total weight of the second negative electrode active material.

Preferably, the first negative electrode mixture layer and the second negative electrode mixture layer may have a thickness ratio of 3:7 to 1:9.

Preferably, the first negative electrode mixture layer may have a loading amount of 50 to 200 mg/25 cm$^2$, and the second negative electrode mixture layer may have a loading amount of 300 to 450 mg/25 cm$^2$.

Preferably, the first polymer binder and the second polymer binder may be independently at least one selected from the group consisting of polyvinylidene fluoride-hexafluoropropylene copolymer (PVDF-co-HFP), polyvinylidene fluoride, polyacrylonitrile, polymethyl methacrylate, polyvinyl pyrrolidone, tetrafluoroethylene, polyethylene, polypropylene, polyacrylic acid, ethylene-propylene-diene monomer (EPDM), sulfonated EPDM, styrene butadiene rubber (SBR), fluorine rubber, and polymers prepared by substituting hydrogen thereof with Li, Na or Ca, and among which styrene butadiene rubber (SBR) is more preferred.

Preferably, the negative electrode may have a thickness of 50 μm to 250 μm.

In another aspect of the present disclosure, there is also provided a lithium secondary battery, comprising a positive electrode, a negative electrode and a separator interposed between the positive electrode and the negative electrode, wherein the negative electrode is a negative electrode described as above.

Advantageous Effects

In the negative electrode according to an embodiment of the present disclosure, a first negative electrode mixture layer containing silicon oxide and natural graphite to give high capacity and high adhesion and serving as a first negative electrode active material is disposed on a negative electrode current collector, and a second negative electrode mixture layer containing artificial graphite to improve output characteristics and serving as a second negative electrode active material is disposed thereon. Thus, the negative electrode may have excellent adhesion, improved output characteristics and improved life characteristics as a high-loading negative electrode.

DESCRIPTION OF DRAWINGS

The accompanying drawings illustrate an embodiment of the present disclosure and together with the foregoing disclosure, serve to provide further understanding of the technical features of the present disclosure, and thus, the present disclosure is not construed as being limited to the drawing.

BEST MODE

Figure 1:
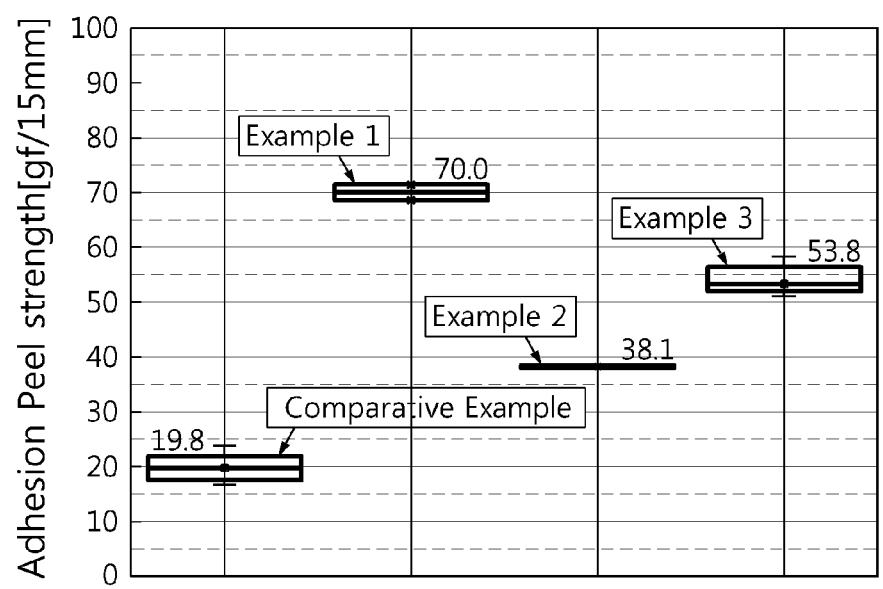
FIG. 1 is a graph showing adhesion measurement results of negative electrodes prepared according to examples of the present disclosure and comparative examples.

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A negative electrode according to the present disclosure includes a negative electrode current collector; a first negative electrode mixture layer containing a first negative electrode active material, a first polymer binder and a first conductive material and formed on at least one surface of the negative electrode current collector; and a second negative electrode mixture layer containing a second negative electrode active material, a second polymer binder and a second conductive material and formed on an upper surface of the first negative electrode mixture layer. At this time, the first negative electrode mixture layer adjacent to the negative electrode current collector contains natural graphite and silicon oxide as the first negative electrode active material, and the second negative electrode mixture layer formed thereon contains artificial graphite as the second negative electrode active material.

In the negative electrode of the present disclosure, the negative electrode mixture layer (or, an electrode layer) is not a single layer but is composed of two layers. Here, the first negative electrode mixture layer in contact with the negative electrode current collector contains natural graphite having excellent adhesion together with silicon oxide exhibiting high capacity, and the second negative electrode mixture layer formed on the first negative electrode mixture layer uses artificial graphite to improve an output due to low resistance.

The silicon oxide used as the first negative electrode active material in the first negative electrode mixture layer exhibits high capacity, but the silicon oxide may change a volume due to expansion and shrinkage of the battery caused by charging and discharging and may also deteriorate adhesion due to weak affinity with a polymer binder. Thus, if natural graphite having good adhesion is used together, the adhesion to a current collector may be improved due to the strong affinity with the polymer binder in comparison to silicon oxide.

In more detail, in a high-loading electrode, if the thickness of the electrode layer increases, the binder may move toward the surface of the electrode layer, which may deteriorates the adhesion in a region of the electrode layer in contact with the current collector. However, since natural graphite having excellent adhesion is used together with SiO for exhibiting high capacity, the adhesion of the first negative electrode mixture layer in contact with the current collector may be improved. In addition, since the adhesion is improved, the contact resistance between the current collector and the active material is lowered, which may improve charging/discharging characteristics.

In addition, the natural graphite can contribute to prevent particle breakage caused by the change of volume of silicon oxide which exhibits high capacity.

Preferably, the first negative electrode active material may contain 80 to 100 wt %, more preferably 90 to 100 wt % of natural graphite and silicon oxide, based on the total weight of the first negative electrode active material. At this time, the natural graphite and the silicon oxide may have a weight ratio of, for example, 80:20 to 95:5, preferably 90:10 to 95:5, more preferably 95:5, and when this weight ratio range is satisfied, the high capacity and adhesion of the negative electrode mixture layer may be improved more advantageously.

Meanwhile, the second negative electrode mixture layer contains artificial graphite as an active material, and, for example, may contain 90 to 100 wt % of artificial graphite, based on the total weight of the second negative electrode active material. The artificial graphite has good particle uniformity, excellent isotropy and higher sphericity in comparison to the natural graphite, so it is easy to intercalate/de-intercalate lithium ions in the charging/discharging process and provides low resistance, thereby improving the output of the battery.

As described above, in the negative electrode according to an embodiment of the present disclosure, the first negative electrode mixture layer capable of giving high capacity and good adhesion is disposed on the negative electrode current collector, and the second negative electrode mixture layer having an excellent output characteristic due to low resistance is disposed thereon, thereby complementing weakness of a conventional high-loading negative electrode.

In the present disclosure, the silicon oxide may be SiO.

In addition, the natural graphite may have a spherical shape and a size of 10 to 25 µm, without being limited thereto.

The artificial graphite may be prepared by thermally treating at least one selected from the group consisting of needle cokes, mosaic cokes and coal-tar pitch. The coal-tar pitch-based artificial graphite may be artificial graphite in the form of MCMB (meso-carbon microbeads).

Preferably, the first negative electrode mixture layer and the second negative electrode mixture layer may have a thickness ratio of 3:7 to 1:9. By adjusting the thickness ratio of the first negative electrode mixture layer containing natural graphite and the second negative electrode mixture layer containing artificial graphite, it is possible to give good adhesion to the current collector as well as high output and long life cycle.

The first negative electrode mixture layer may have a loading amount of 50 to 200 mg/25 cm$^2$, and the second negative electrode mixture layer may have a loading amount of 300 to 450 mg/25 cm$^2$.

In the present disclosure, the first conductive material and the second conductive material are not specially limited as long as they have electrical conductivity without causing a chemical change in the battery, and for example, they may individually use graphite such as natural graphite and artificial graphite; carbon black such as carbon black, acetylene black, Ketjen black, channel black, furnace black, lamp black and summer black; conductive fiber such as carbon fiber and metal fiber; metal powder such as carbon fluoride, aluminum and nickel powder; conductive whiskers such as zinc oxide and potassium titanate; conductive oxide such as titanium oxide; polyphenylene derivatives; conductive material such as carbon nanotube (CNT), carbon nanofiber (CNF) and graphene carbon derivatives, and the like. The conductive material may be included in an amount of 0.1 to 5 wt %, based on the total solid content of the negative electrode mixture layer. Preferably, the conductive material may be included in amount of 0.5 to 3 wt %, based on the total solid content of the negative electrode mixture layer.

The first polymer binder and the second polymer binder are independently components that assist in the bonding of the active material and the conductive material and the bonding to the current collector, and may use various kinds of binder polymers such as polyvinylidene fluoride-hexafluoropropylene copolymer (PVDF-co-HFP), polyvinylidene fluoride, polyacrylonitrile, polymethyl methacrylate, polyvinyl pyrrolidone, tetrafluoroethylene, polyethylene, polypropylene, polyacrylic acid, ethylene-propylene-diene monomer (EPDM), sulfonated EPDM, styrene butadiene rubber (SBR), polymers prepared by substituting hydrogen thereof with Li, Na or Ca, and various copolymers, among which styrene butadiene rubber (SBR) is more preferred. The binder may be included in an amount of 0.1 to 5 wt %, based on the total solid content of the negative electrode mixture layer. Preferably, the conductive material may be included in an amount of 1.5 to 3 wt %, based on the total solid content of the negative electrode mixture layer.

The negative electrode current collector is not specially limited as long as it has electrical conductivity without causing a chemical change in the battery. For example, the negative electrode current collector may use copper, stainless steel, aluminum, nickel, titanium, sintered carbon, copper or stainless steel surface-treated with carbon, nickel, titanium, silver or the like, aluminum-cadmium alloy, or the like. In addition, similar to a positive electrode current collector, fine unevenness may be formed on the surface of the negative electrode current collector to enhance the bonding force of the negative electrode active material, and the negative electrode current collector may have various forms such as film, sheet, foil, net, porous body, foam, nonwoven fabric and the like.

In addition, the negative electrode according to an embodiment of the present disclosure may have a thickness of 50 μm to 250 μm.

A lithium secondary battery of the present disclosure includes a positive electrode, a negative electrode and a separator interposed between the positive electrode and the negative electrode, similar to a common lithium secondary battery.

The positive electrode includes a positive electrode current collector and a positive electrode mixture layer formed on at least one surface of the positive electrode current collector. The positive electrode mixture layer may contain a positive electrode active material, a conductive material and a polymer binder.

The positive electrode active material may be lithium-containing oxide, and may preferably use lithium-containing transition metal oxide. For example, the lithium-containing transition metal oxide may be any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3), and mixtures thereof, and the lithium-containing transition metal oxide may be coated with a metal such as aluminum (Al) or a metal oxide. In addition, sulfide, selenide, halide or the like may also be used in addition to the lithium-containing transition metal oxide.

The positive electrode current collector is not specially limited as long as it has high conductivity without causing a chemical change in the battery, and, for example, may use stainless steel, aluminum, nickel, titanium, sintered carbon, or aluminum or stainless steel surface-treated with carbon, nickel, titanium, silver or the like. The current collector may have fine unevenness formed on a surface thereof to enhance the adhesion of the positive electrode active materials, and may have various forms such as film, sheet, foil, net, porous body, foam, nonwoven fabric and the like.

The separator may be a porous polymer substrate, and size and porosity of pores existing in the porous polymer substrate may be about 0.01 to about 50 μm and about 10 to about 95%, respectively, without being limited thereto.

In addition, the porous polymer substrate may include a porous coating layer including inorganic particles and a polymer binder on at least one surface of the porous polymer substrate in order to enhance mechanical strength and suppress short circuit between the positive electrode and the negative electrode.

The porous polymer substrate may be made of any one selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyether sulfone, polyphenylene oxide, cyclic olefin copolymer, polyphenylene sulfide, polyethylene naphthalene, and mixtures thereof, without being limited thereto.

Hereinafter, the present disclosure will be described in detail based on examples. However, the examples of the present disclosure can be modified in various ways, and the scope of the present disclosure should not be limited to the following embodiments. The examples of the present disclosure are provided for more clear and perfect explanation of the present disclosure to those skilled in the art.

Example 1

89.8 wt % of natural graphite, 4.7 wt % of SiO, 1.5 wt % of carbon black, 3 wt % of SBR binder and 1 wt % of CMC were mixed to prepared first negative electrode slurry, and 94.5 wt % of artificial graphite (coal-tar pitch), 1.5 wt % of carbon black, 3 wt % of SBR binder and 1 wt % of CMC were mixed to prepare second negative electrode slurry.

The first negative electrode slurry was coated on a copper foil in a loading amount of 149 mg/25 cm², the second negative electrode slurry was coated on an upper surface of the first negative electrode slurry in a loading amount of 345 mg/25 cm², and then they were dried for 10 hours or more in a vacuum oven of 100° C. Then, a roll-type press is used to make a negative electrode (with the total thickness of 159.6 μm) composed of a first negative electrode mixture layer with a thickness of 48.1 μm and a second negative electrode mixture layer with a thickness of 111.5 μm.

In addition, 98.0 wt % of Li (Ni$_{1/3}$Mn$_{1/3}$Co$_{1/3}$)O$_2$, 0.5 wt % of carbon nano tube and 1.5 wt % of PVdF (binder) were mixed to prepare slurry as a positive electrode active material, and then the positive electrode mixture slurry was coated on an aluminum foil in a loading amount of 952.1 mg/25 cm² and then dried for 10 hours or more in a vacuum oven of 130° C. Then, a roll-type press was used to make a positive electrode with a thickness of 135 μm.

The negative electrode and the positive electrode prepared as above were used, and a polyolefin separator was interposed between the negative electrode and the positive electrode. Then, an electrolyte in which 1M LiPF$_6$ was dissolved and ethylene carbonate (EC), dimethyl carbonate (DMC) and ethyl methyl carbonate (EMC) in a volume ratio of 3:4:3 as well as additives containing 3 wt % of VC, 0.5 wt % of PS and 1 wt % of ESA were mixed was injected thereto to make a monocell with a size of 16.5 cm², based on the negative electrode.

Example 2

85.1 wt % of natural graphite, 9.4 wt % of SiO, 1.5 wt % of carbon black, 3 wt % of SBR binder and 1 wt % of CMC were mixed to prepare first negative electrode slurry, and 94.5 wt % of artificial graphite (coal-tar pitch), 1.5 wt % of carbon black, 3 wt % of SBR binder and 1 wt % of CMC were mixed to prepare second negative electrode slurry.

The first negative electrode slurry was coated on a copper foil in a loading amount of 150 mg/25 cm², the second negative electrode slurry was coated on an upper surface of the first negative electrode slurry in a loading amount of 347 mg/25 cm², and then they were dried for 10 hours or more in a vacuum oven of 100° C. Then, a roll-type press was used to make a negative electrode (with the total thickness of 156.2 μm) composed of a first negative electrode mixture layer with a thickness of 47.1 μm and a second negative electrode mixture layer with a thickness of 109.1 μm. Except for the above, a monocell was prepared in the same way as Example 1.

Example 3

89.8 wt % of natural graphite, 4.7 wt % of SiO, 1.5 wt % of carbon black, 3 wt % of SBR binder and 1 wt % of CMC were mixed to prepare first negative electrode slurry, and 94.5 wt % of artificial graphite (coal-tar pitch), 1.5 wt % of carbon black, 3 wt % of SBR binder and 1 wt % of CMC were mixed to prepare second negative electrode slurry.

The first negative electrode slurry was coated on a copper foil in a loading amount of 50 mg/25 cm², and the second negative electrode slurry was coated on an upper surface of the first negative electrode slurry in a loading amount of 447 mg/25 cm², and then they were dried for 10 hours or more in a vacuum oven of 100° C. Then, a roll-type press was used to make a negative electrode (with the total thickness of 160.5 μm) composed of a first negative electrode mixture layer with a thickness of 16.1 μm and a second negative electrode mixture layer with a thickness of 144.4 μm. Except for the above, a monocell was prepared in the same way as Example 1.

Comparative Example 66.1 wt % of artificial graphite (coal-tar pitch), 26.9 wt % of natural graphite, 1.5 wt % of SiO, 1.5 wt % of carbon black, 3 wt % of SBR binder and 1 wt % of CMC were mixed to prepare negative electrode slurry, and then the negative electrode slurry was coated on a copper foil in a loading amount of 495 mg/25 cm². Except for the above, a monocell was prepared in the same way as Example 1.

Test of Electrode Adhesion

Adhesions of the negative electrodes prepared according to Examples 1 to 3 and the Comparative Example were measured. The measurement results are shown in FIG. 1. Referring to FIG. 1, Examples 1 to 3 exhibit high adhesions in comparison to the Comparative Example, and thus the subject invention may make it possible to prevent the peeling of the active material and to suppress the volume change caused by expansion of the battery during high-temperature storage or life evaluation.

In particular, in Examples 1 and 3, when natural graphite and SiO are used as a mixture, the ratio of natural graphite is higher, which increases the affinity with the SBR binder and thus ensures more excellent adhesion. In particular, in Example 1, the first negative electrode mixture layer containing natural graphite has a relatively increased thickness, thereby ensuring most excellent adhesion.

Test of Charge/Discharge Rate

Figure 2A:
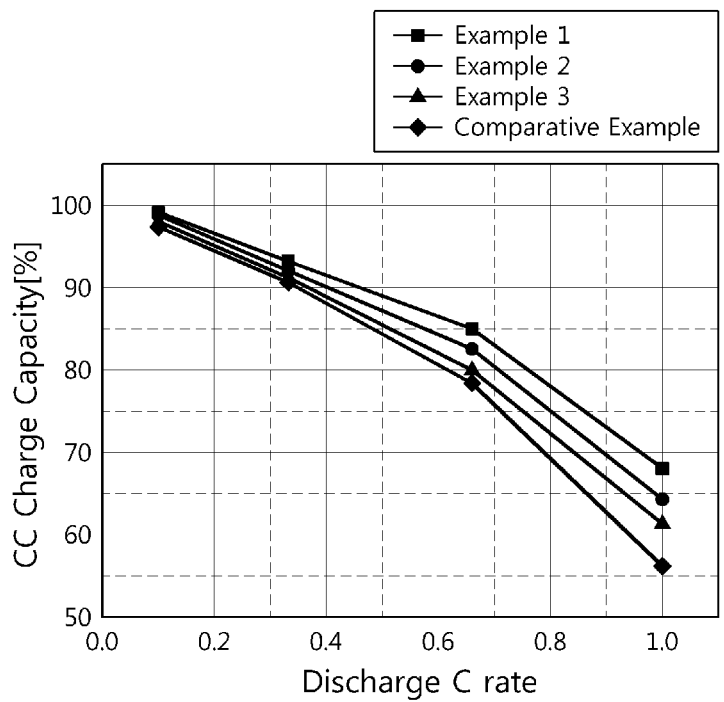
FIGS. 2a and 2b are graphs showing charge/discharge capacities according to rates of monocells prepared according to examples of the present disclosure and comparative examples.
Figure 2B:
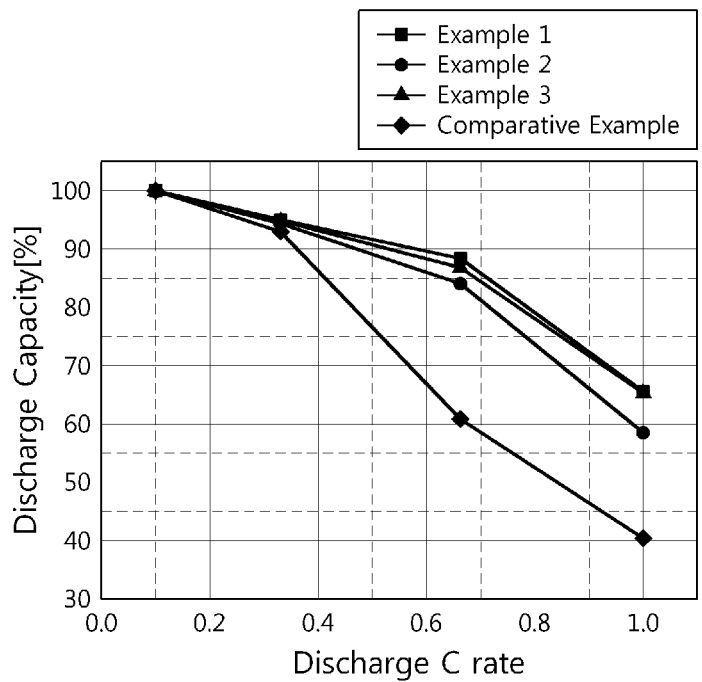

Charge capacities of the monocells prepared according to Examples 1 to 3 and the Comparative Example were measured according to a given rate. The measurement results are shown in FIG. 2a. Also, discharge capacities were measured, whose results are shown in FIG. 2b. In the evaluation at each charge rate, after progressing to a given discharge rate, the charge rate was increased and then charging/discharging was performed. Then, among charge capacities measured at each rate, a CC charge capacity was measured. In case of the discharge rate characteristic, a discharge capacity measured according to a given rate was measured, identical to the charge rate evaluation. Referring to FIGS. 2a and 2b, as a result of the charging/discharging rate evaluation, Examples 1 to 3 exhibit better rate characteristics in comparison to the Comparative Example. Compared with the Comparative Example in which mixture slurry prepared by dispersing three kinds of active materials is coated, in Examples 1 to 3, the second negative electrode mixture layer is prepared by dispersing only artificial graphite which may give excellent output performance, and thus it is possible to make a negative electrode in which the active material is regularly dispersed, and also the charging/discharging characteristics are improved resultantly. In addition, the high adhesion checked as above lowers the contact resistance between the current collector and the active material, which may improve the charging/discharging characteristics.

Test of Storage Characteristics

Figure 3A:
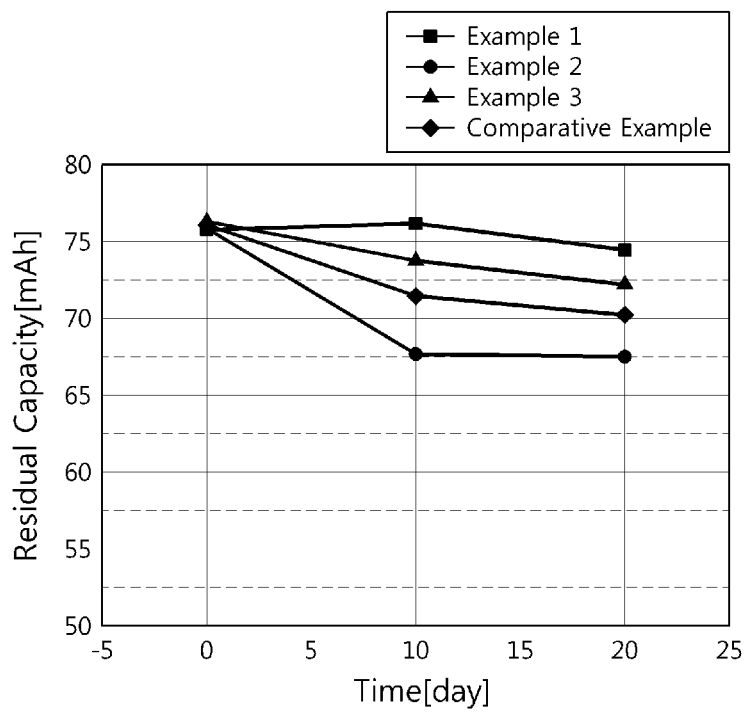
FIGS. 3a and 3b are graphs showing storage characteristic measurement results of monocells prepared according to examples of the present disclosure and comparative examples.
Figure 3B:
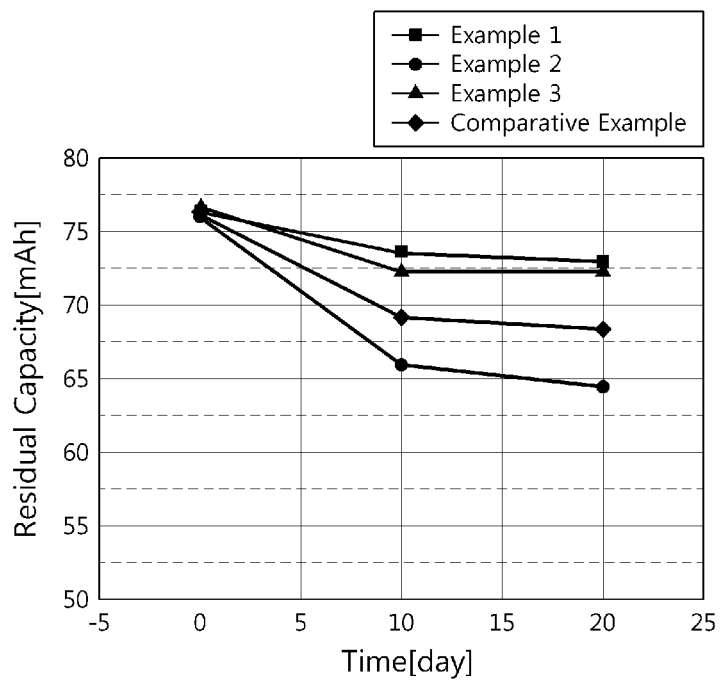

The monocells prepared according to Examples 1 to 3 and the Comparative Example were stored in a chamber of 60° C. in a fully charged state, and they were taken out at 10th day and 20th day to measure residual capacities when charging/discharging was performed. The measurement results are shown in FIG. 3a. Also, the recovery capacities were measured, and the results are shown in FIG. 3b. Referring to FIGS. 3a and 3b, Examples 1 and 3 exhibit high storage capability in comparison to the Comparative Example. Example 2 exhibits lower storage capability in comparison to the Comparative Example, but it is regarded that as the content of SiO having a high charging expansion rate increases, fine cracks are generated in the electrode due to the volume expansion in a fully charged state, and thus a conductive route is cut to lower the storage capability partially. In Examples 1 and 3 and the Comparative Example which have the same content of SiO, Example 1 exhibits highest storage capability. This is because in the adhesion evaluation results as above, adhesion is greatly maintained at high-temperature storage due to the excellent capability at the charging/discharging rate, and the charging/discharging rate capacity is high.

Test of Life Characteristics

Life characteristics of the prepared according to Examples 1 to 3 and the Comparative Example were evaluated while performing charging/discharging under the conditions of 1 C charging, 1 C discharging and 0.05 C cut-off. The evaluation results are shown in FIG. 4.

Figure 4:
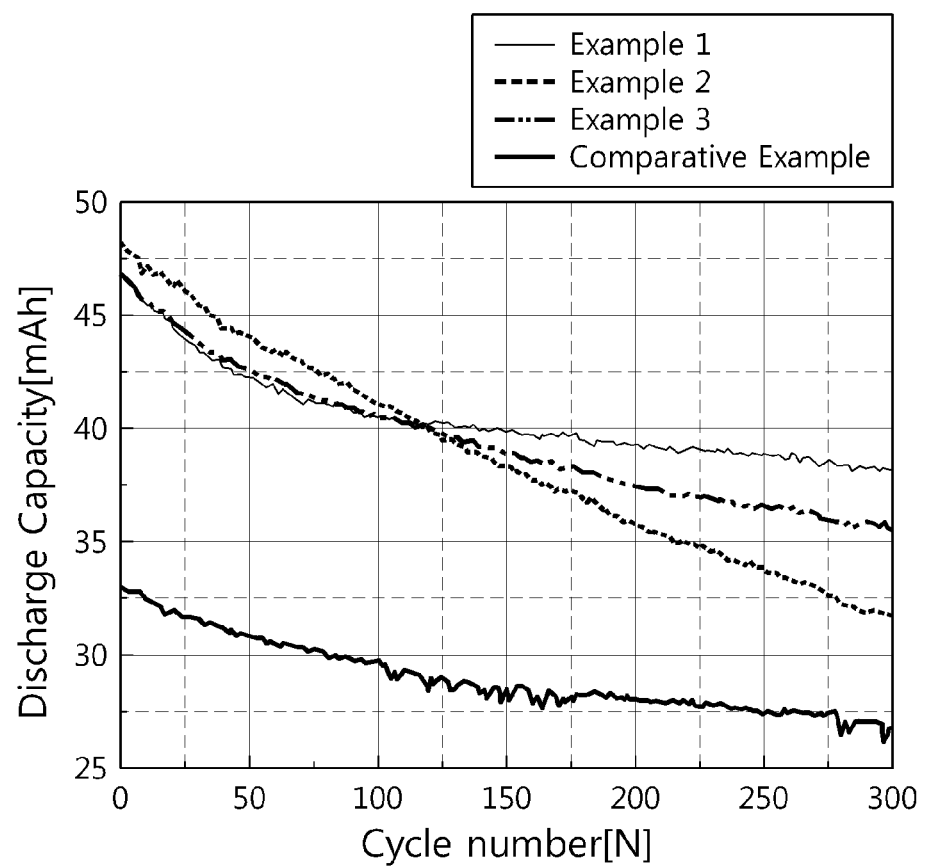
FIG. 4 is a graph showing life characteristic measurement results of monocells prepared according to examples of the present disclosure and comparative examples.

As shown in FIG. 4, the adhesion was improved in Examples 1 to 3 during 300 cycles. Thus, Examples 1 to 3 have excellent discharge capacity in comparison to the Comparative Example.

What is claimed is:

1. A negative electrode for a lithium secondary battery, comprising:
   a negative electrode current collector;
   a first negative electrode mixture layer containing a first negative electrode active material, a first polymer binder and a first conductive material and formed on at least one surface of the negative electrode current collector; and
   a second negative electrode mixture layer containing a second negative electrode active material, a second polymer binder and a second conductive material and formed on an upper surface of the first negative electrode mixture layer,
   wherein the first negative electrode active material contains natural graphite and silicon oxide, and the second negative electrode active material consists of artificial graphite.

2. The negative electrode for a lithium secondary battery according to claim 1, wherein the first negative electrode active material contains 80 to 100 wt % of natural graphite and silicon oxide, based on the total weight of the first negative electrode active material.

3. The negative electrode for a lithium secondary battery according to claim 1, wherein the natural graphite and the silicon oxide have a weight ratio of 80:20 to 95:5.

4. The negative electrode for a lithium secondary battery according to claim 3, wherein the natural graphite and the silicon oxide have a weight ratio of 90:10 to 95:5.

5. The negative electrode for a lithium secondary battery according to claim 1, wherein the second negative electrode active material contains 90 to 100 wt % of artificial graphite, based on the total weight of the second negative electrode active material.

6. The negative electrode for a lithium secondary battery according to claim 1, wherein the first negative electrode mixture layer and the second negative electrode mixture layer have a thickness ratio of 3:7 to 1:9.

7. The negative electrode for a lithium secondary battery according to claim 1, wherein the first negative electrode mixture layer has a loading amount of 50 to 200 mg/25 cm$^2$, and the second negative electrode mixture layer has a loading amount of 300 to 450 mg/25 cm$^2$.

8. The negative electrode for a lithium secondary battery according to claim 1, wherein the first polymer binder and the second polymer binder are independently at least one selected from the group consisting of polyvinylidene fluoride-hexafluoropropylene copolymer (PVDF-co-HFP), polyvinylidene fluoride, polyacrylonitrile, polymethyl methacrylate, polyvinyl pyrrolidone, tetrafluoroethylene, polyethylene, polypropylene, polyacrylic acid, ethylene-propylene-diene monomer (EPDM), sulfonated EPDM, styrene butadiene rubber (SBR), fluorine rubber, and polymers prepared by substituting hydrogen thereof with Li, Na or Ca.

9. The negative electrode for a lithium secondary battery according to claim 8, wherein the first polymer binder and the second polymer binder are respectively styrene butadiene rubber (SBR).

10. The negative electrode for a lithium secondary battery according to claim 1, wherein the negative electrode has a thickness of 50 μm to 250 μm.

11. A lithium secondary battery, comprising a positive electrode, a negative electrode and a separator interposed between the positive electrode and the negative electrode, wherein the negative electrode is a negative electrode defined in claim 1.

* * * * *